(12) United States Patent
Pesyna et al.

(10) Patent No.: US 11,339,744 B1
(45) Date of Patent: May 24, 2022

(54) PRESSURE EQUALIZATION IN A DUAL FLOW PATH EXHAUST OF A HYPERSONIC PROPULSION SYSTEM

(71) Applicant: Rolls-Royce North American Technologies Inc., Indianapolis, IN (US)

(72) Inventors: Kenneth M. Pesyna, Carmel, IN (US); Todd S. Taylor, Bargersville, IN (US); Nicholas Metzger, Fishers, IN (US); Timothy Roesler, Plainfield, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 266 days.

(21) Appl. No.: 16/785,052

(22) Filed: Feb. 7, 2020

(51) Int. Cl.
| | |
|---|---|
| F02K 1/06 | (2006.01) |
| B64D 33/04 | (2006.01) |
| F02K 1/80 | (2006.01) |
| F02K 1/62 | (2006.01) |
| F02K 3/075 | (2006.01) |
| F02K 1/12 | (2006.01) |
| F02K 7/16 | (2006.01) |
| B64D 33/02 | (2006.01) |

(52) U.S. Cl.
CPC .............. F02K 1/06 (2013.01); B64D 33/04 (2013.01); F02K 1/12 (2013.01); F02K 1/62 (2013.01); F02K 1/805 (2013.01); F02K 3/075 (2013.01); *B64D 2033/026* (2013.01); *F02K 7/16* (2013.01); *F05D 2220/10* (2013.01)

(58) Field of Classification Search
CPC ........... F02K 3/075; F02K 7/16; B64D 33/04; B64D 2033/026; F05D 2220/10
See application file for complete search history.

(56) References Cited

U.S. PATENT DOCUMENTS

| | | | | |
|---|---|---|---|---|
| 2,625,008 | A * | 1/1953 | Crook | F02K 1/1223 239/127.3 |
| 3,324,660 | A * | 6/1967 | Lane | F02K 7/16 60/244 |
| 3,685,738 | A * | 8/1972 | Leibach | F02K 1/12 239/265.39 |
| 4,392,615 | A * | 7/1983 | Madden | F02K 1/12 239/265.37 |
| 4,544,098 | A * | 10/1985 | Warburton | F02K 1/822 239/127.3 |
| 4,575,006 | A * | 3/1986 | Madden | F16J 15/00 239/265.29 |
| 4,587,806 | A * | 5/1986 | Madden | F02K 1/006 239/265.37 |
| 4,919,364 | A * | 4/1990 | John | F02C 7/042 60/225 |
| 5,094,070 | A * | 3/1992 | Enderle | F02K 1/1215 60/224 |
| 5,186,390 | A * | 2/1993 | Enderle | F02K 1/1223 244/12.5 |
| 5,284,014 | A | 2/1994 | Brossier et al. | |

(Continued)

*Primary Examiner* — Alain Chau
(74) *Attorney, Agent, or Firm* — Barnes & Thornburg LLP

(57) ABSTRACT

A dual flow path exhaust assembly for use with a combined turbofan and ramjet engine includes a turbofan engine exhaust duct, a ramjet engine exhaust duct, a combined outlet, and door configured to move between an open position and a closed position to selectively isolate the turbofan engine exhaust duct from the combined outlet.

19 Claims, 14 Drawing Sheets

(56) References Cited

U.S. PATENT DOCUMENTS

| | | | |
|---|---|---|---|
| 5,694,768 | A | 12/1997 | Johnson et al. |
| 7,140,174 | B2 | 11/2006 | Johnson |
| 7,762,077 | B2 * | 7/2010 | Pederson ............... B64C 30/00 60/767 |
| 8,356,483 | B2 | 1/2013 | Petty et al. |
| 8,701,379 | B2 | 4/2014 | Bulman |
| 9,109,539 | B2 | 8/2015 | Duge et al. |
| 9,856,824 | B2 * | 1/2018 | Lerg ....................... F02K 1/42 |
| 10,094,336 | B2 | 10/2018 | Makowski et al. |
| 10,309,318 | B2 | 6/2019 | Ruberte Sanchez |
| 2008/0128547 | A1 * | 6/2008 | Pederson ............... F02K 7/18 60/761 |
| 2008/0283677 | A1 * | 11/2008 | Pederson ............... B64C 30/00 244/73 R |

\* cited by examiner

PRESSURE EQUALIZATION IN A DUAL FLOW PATH EXHAUST OF A HYPERSONIC PROPULSION SYSTEM

FIELD OF THE DISCLOSURE

The present disclosure relates generally to propulsion systems including gas turbine engines and ramjet engines, and more specifically to pressure equalization and component cooling in a dual flow path exhaust of a hypersonic propulsion system.

BACKGROUND

Gas turbine engines are used to propel aircraft and the like at relatively low speeds, including subsonic speeds and some supersonic speeds, for example, speeds up to about Mach 2.5. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Ramjet engines are used to propel aircraft and the like at relatively high speeds, including supersonic and hypersonic speeds, for example, speeds of Mach 2.5 and greater. A ramjet engine uses the engine's forward motion to compress incoming air without the use of a mechanical compressor. Because a ramjet engine relies on the engine's forward motion to compress incoming air, a ramjet-powered aircraft may use another means of propulsion such as a gas turbine engine to accelerate the aircraft from a standstill to a speed at which the ramjet engine becomes operable.

A gas turbine engine may be combined with a ramjet engine in a single engine housing or nacelle for use with an aircraft. The gas turbine engine may be operated while the ramjet engine is inoperable in order to accelerate the aircraft from standstill to a speed at which the ramjet engine becomes operable. Once the aircraft has been accelerated to a speed at which the ramjet is operable, the ramjet engine may then be placed into operation to propel the aircraft at high speeds and the gas turbine engine may be taken out of operation.

Such a gas turbine and ramjet engine combination may include a housing defining a gas turbine engine exhaust duct receiving exhaust from the gas turbine engine, a ramjet exhaust duct receiving exhaust from the ramjet engine, and a combine outlet receiving exhaust from the gas turbine engine exhaust duct and the ramjet engine exhaust duct. The housing may include a door that selectively blocks the gas turbine engine exhaust duct from the exhaust nozzle when the ramjet is in operation and the gas turbine engine is not in operation. Such a door, however, may be difficult to operate due to pressure differential on opposite sides of the door. Also, the gas turbine engine exhaust duct, the ramjet exhaust duct, the combined outlet, and the door are subject to extreme heat, but are difficult to cool.

SUMMARY

The present disclosure may comprise one or more of the following features and combinations thereof.

A dual flow path exhaust assembly for use with a combined turbofan and ramjet engine that includes a turbofan engine configured to provide a first stream of pressurized exhaust and a ramjet engine configured to provide a second stream of pressurized exhaust. The exhaust assembly includes a housing, a door, and an actuator. The housing includes a turbofan engine exhaust duct, a ramjet engine exhaust duct, and a combined outlet defined by a confluence of an aft end of the turbofan engine exhaust duct and an aft end of the ramjet engine exhaust duct. The turbofan engine exhaust duct defines a first flow path configured to convey the first stream of pressurized exhaust therethrough. The ramjet engine exhaust duct defines a second flow path configured to convey the second stream of pressurized exhaust therethrough. The combined outlet is in fluid communication with the ramjet engine exhaust duct and in selective fluid communication with the turbofan engine exhaust duct. The combined outlet is configured to receive the second stream of pressurized exhaust therethrough and to selectively receive and convey the first stream of pressurized exhaust therethrough.

The door is coupled to the housing and configured to selectively block the turbofan engine exhaust duct from the ramjet engine exhaust duct and the combined outlet. The actuator configured to move the door between an open position in which the door exposes the turbofan engine exhaust duct to the ramjet engine exhaust duct and the combined outlet and a closed position in which the door blocks the turbofan engine exhaust duct from the ramjet engine exhaust duct and the combined outlet.

The housing and the door cooperate to define a cavity therebetween on a side of the door opposite the ramjet exhaust duct. The housing and the door cooperate to define a pressure equalization passage in continuous fluid communication with the combined outlet and the cavity to cause at least a portion of a pressure of the second stream of pressurized exhaust to be applied to the door opposite the ramjet exhaust duct.

In some embodiments, the door may include a forward panel and an aft panel. The aft panel may be pivotably coupled to the forward panel.

In some embodiments, the aft panel of the door may include a forward end and an aft end. The aft panel may be pivotably coupled to the housing at a pivot point proximate and spaced from the aft end of the aft panel of the door. The aft end of the aft panel of the door may travel through an arcuate path as the door cycles between the open position and the closed position.

In some embodiments, the pivot point may be forward of the aft end of the aft panel of the door both when the door is in the open position and when the door is in the closed position. In some embodiments, the aft end of the aft panel of the door may extend into the cavity at least when the door is in the closed position.

In some embodiments, the door may define a portion of the combined outlet both when the door is in the open position and when the door is in the closed position. In some embodiments, the actuator may be configured to move a forward portion of the aft panel of the door between a first position in which the forward portion of the aft panel of the door is distant from the port and a second position in which the forward portion of the aft panel of the door abuts the portion of the housing separating the turbofan engine exhaust duct from the ramjet engine exhaust duct.

In some embodiments, the actuator may include a linear actuator. The linear actuator may have a first end connected to the housing and a second end connected to the door proximate the pivotable coupling of the forward door panel to the aft door panel.

In some embodiments, the dual flow path exhaust assembly may include a slider engaged with a track coupled to the housing. The forward portion of the forward panel of the door may be pivotably coupled to the slider. The track may guide the forward portion of the slider in a fore and aft direction as the door moves between the open position and the closed position.

In some embodiments, the dual flow path exhaust assembly may include track engaging members engaged with a track coupled to the housing. A forward portion of the forward panel of the door may be coupled to the track engaging members. The track may guide the track engaging members in a fore and aft direction as the door moves between the open position and the closed position.

In some embodiments, the pressure equalization passage may include a gap between the housing and an aft portion of the aft panel of the door. In some embodiments, the pressure equalization passage may include at least one metered hole defined by a seal panel sealingly engaged with the housing and an aft portion of the aft panel of the door.

According to another aspect of the disclosure, a dual flow path exhaust assembly for use with a combined turbofan and ramjet engine may include a housing, a door, and an actuator. The housing may include a first exhaust duct, a second exhaust duct, and a combined outlet defined by a convergence of an aft end of the first exhaust duct and an aft end of the second exhaust duct. The combined outlet is in fluid communication with the second engine exhaust duct and in selective fluid communication with the first exhaust duct. The door is configured to selectively block the first exhaust duct from the second exhaust duct and the combined outlet. The actuator is configured to move the door between an open position in which the door exposes the first exhaust duct to the second exhaust duct and the combined outlet and a closed position in which the door blocks the first exhaust duct from the second exhaust duct and the combined outlet.

The housing and the door cooperate to define a cavity therebetween on a side of the door opposite the ramjet exhaust duct. The housing and the door cooperate to define a pressure equalization passage in continuous fluid communication with the combined outlet and the cavity.

In some embodiments, the door may include a forward panel and an aft panel pivotably coupled to the forward panel. The aft panel of the door may include a forward end, an aft end, and a pivot point proximate the aft end. The aft end of the aft panel of the door travels through an arcuate path as the door moves between the open position and the closed position.

In some embodiments, the door may define a portion of the combined outlet both when the door is in the open position and when the door is in the closed position.

In some embodiments, the dual flow path exhaust assembly may include a slider engaged with a track coupled to the housing. The forward portion of the forward panel of the door may be pivotably coupled to the slider. The track may guide the forward portion of the slider in a fore and aft direction as the door moves between the open position and the closed position.

In some embodiments, the dual flow path exhaust assembly may include track engaging members engaged with a track coupled to the housing. The forward portion of the forward panel of the door may be coupled to the track engaging members. The track may guide the track engaging members in a fore and aft direction as the door moves between the open position and the closed position.

In some embodiments, the actuator may include a linear actuator. The linear actuator may have a first end connected to the housing and a second end connected to the door proximate the pivotable coupling of the forward door panel to the aft door panel.

In some embodiments, the pressure equalization passage may include a gap between the housing and an aft portion of the aft panel of the door. The gap may remain constant as the door moves between the open position and the closed position.

According to another aspect of the present disclosure, a dual flow path exhaust assembly for use with a combined turbofan and ramjet engine may include a housing, a door, and an actuator. The housing may include a first exhaust duct, a second exhaust duct, and a combined outlet defined by a convergence of an aft end of the first exhaust duct and an aft end of the second exhaust duct. The combined outlet may be in fluid communication with the second engine exhaust duct and in selective fluid communication with the first exhaust duct. The door may be configured to selectively block the first exhaust duct from the second exhaust duct and the combined outlet.

The actuator may be configured to move the door between an open position in which the door exposes the first exhaust duct to the second exhaust duct and the combined outlet, a closed position in which the door blocks the first exhaust duct from the second exhaust duct and the combined outlet, and a plurality of positions between the open position and the closed position to vary a throat of the assembly.

The door may include a forward panel and an aft panel pivotably coupled to the forward panel. The aft panel of the door may include a forward end, an aft end, and a pivot point proximate the aft end. The aft end of the aft panel of the door may travel through an arcuate path as the door moves between the open position and the closed position.

According to another aspect of the disclosure, a method of controlling flow through a combined outlet of a dual flow path exhaust assembly including a first exhaust duct and a second exhaust duct converging together to define the combined outlet may include a number of steps. The method may include providing a housing defining the first exhaust duct, the second exhaust duct, and the combined outlet; providing a door configured to selectively block the first exhaust duct from the second exhaust duct and the combined outlet, the door comprising a forward panel and aft panel pivotably connected to the forward panel, the forward panel engaged with a track coupled to the housing and the aft panel pivotably coupled to the housing, the door cooperating with the housing to define a cavity therebetween on a side of the door opposite the combined outlet and distinct from the first exhaust duct, the second exhaust duct and the combined outlet; providing an actuator configured to cycle a forward portion of the aft panel of the door between a first position in which the forward portion of the aft panel of the door is distant from a portion of the housing separating the first exhaust duct from the second exhaust duct and a second position in which the forward portion of the aft panel of the door abuts the portion of the housing separating the first exhaust duct from the second exhaust duct; and moving the forward portion of the aft panel between the first position wherein the door blocks the first exhaust duct from the second exhaust duct and the second position wherein the first exhaust duct is exposed to the second exhaust duct so that the gap remains constant.

These and other features of the present disclosure will become more apparent from the following description of the illustrative embodiments.

DETAILED DESCRIPTION OF THE DRAWINGS

Figure 1A:
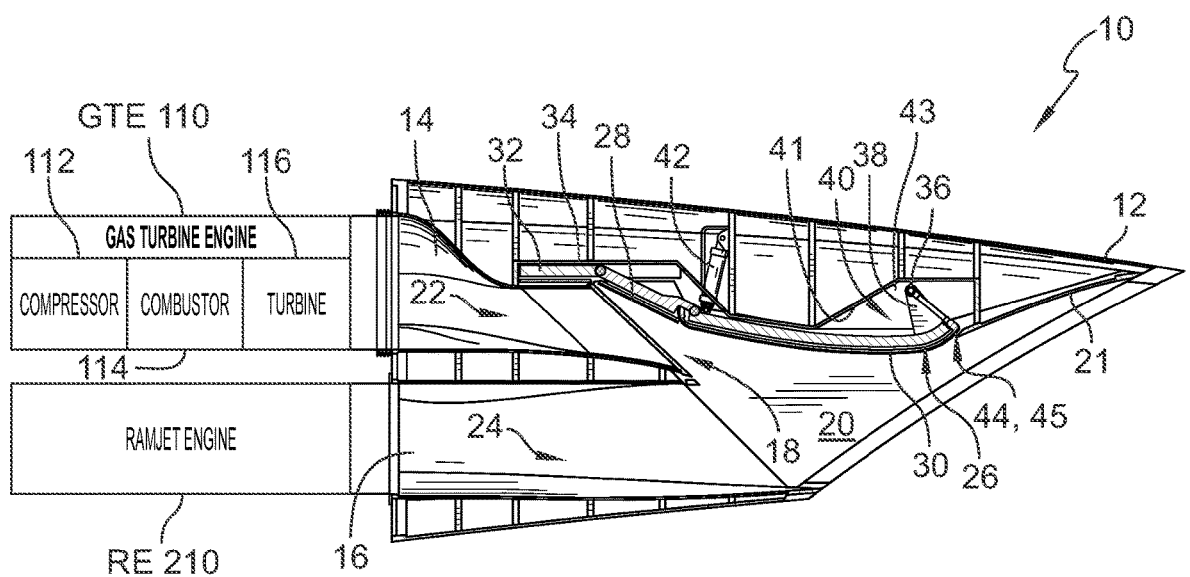
FIG. 1A is a diagrammatic and cross-sectional side elevation view of a dual flow path exhaust assembly of a combined turbofan and ramjet engine according to the present disclosure, the assembly including a housing defining a turbofan engine exhaust duct and a corresponding a first flow path, a ramjet exhaust duct and a corresponding second flow path, a combined outlet defined by the convergence of the turbofan engine exhaust duct and the ramjet exhaust duct, and a door configured to move between a plurality of positions to vary a throat of the nozzle and to selectively block the turbofan engine exhaust duct from the ramjet exhaust duct and the combined outlet and showing the door in a fully open position.

For the purposes of promoting an understanding of the principles of the disclosure, reference will now be made to a number of illustrative embodiments shown in the drawings and specific language will be used to describe the same.

The drawings show illustrative embodiments of a dual flow path exhaust assembly 10 for use with a combined turbofan and ramjet engine including a turbofan engine 110 configured to provide a first stream of pressurized exhaust and a ramjet engine 210 configured to provide a second stream of pressurized exhaust.

As shown in FIGS. 1A-5B, an illustrative embodiment of the assembly 10 includes a housing 12 including a first exhaust duct (which may be referred to herein as a turbofan engine exhaust duct) 14, a second exhaust duct (which may be referred to herein as a ramjet engine exhaust duct) 16, a port 18 at the confluence of the first exhaust duct 14 and the second exhaust 16 duct, and a combined outlet 20 aft of the confluence of the first exhaust duct 14 and the second exhaust 16 duct. The first exhaust duct 14 defines a first flow path 22 configured to convey the first stream of pressurized exhaust from a turbofan engine 110 or other gas turbine engine GTE 110 to the combined outlet 20. Similarly, the second exhaust duct 16 defines a second flow path 24 configured to convey the second stream of pressurized exhaust from a ramjet engine RE 210 to the combined outlet 20. The combined outlet 20 defines a combined flow path configured to convey the first and second streams of pressurized exhaust to the environment outside the housing 12. The port 18 selectively couples the first exhaust duct 14 with the second exhaust duct 16 in fluid communication with each other.

The assembly 10 also includes a door 26 configured to move between open and closed positions to selectively block the port 18, thereby selectively blocking the first exhaust duct 14 from the second exhaust duct 16 and the combined outlet 20 as suggested in FIGS. 1A-3B. The door includes a forward panel 28 and an aft panel 30. The aft end of the forward panel 28 is pivotably coupled to the forward end of the aft panel 30.

The forward end of the forward panel 28 of the door 26 is pivotably coupled to a slider 32 as shown in FIGS. 1A-2B. The slider 32 is slidingly engaged with corresponding tracks 34 connected to the housing 12. The slider 32 and the tracks 34 are configured so that the slider 32 and, therefore, the forward end of the forward panel 28 of the door 26, may move in a fore and aft direction with respect to the housing 12 when the door 26 is moved between the open and closed positions, as will be discussed further below.

The aft end of the aft panel 30 of the door 26 is coupled to the housing 12 via pivots 36 so that the aft panel 30 may pivot with respect to the housing 12 as shown in FIGS. 1A-2B. The pivots 36 are located at distal ends of pivot arms 38 extending from a surface of the aft panel 30 of the door 26 facing outwardly away from the second duct 16 in a direction perpendicular to the surface of the aft panel 30. The pivots 36 are located forward of the aft end of the aft panel 30 of the door 26. The location of the pivots 36 with respect to the housing 12 and aft panel 30 of the door 26 provides that the aft end of the aft panel 30 of the door 26 travels through an arc when the aft panel 30 of the door 26 is pivoted with respect to the housing 12.

Figure 1B:
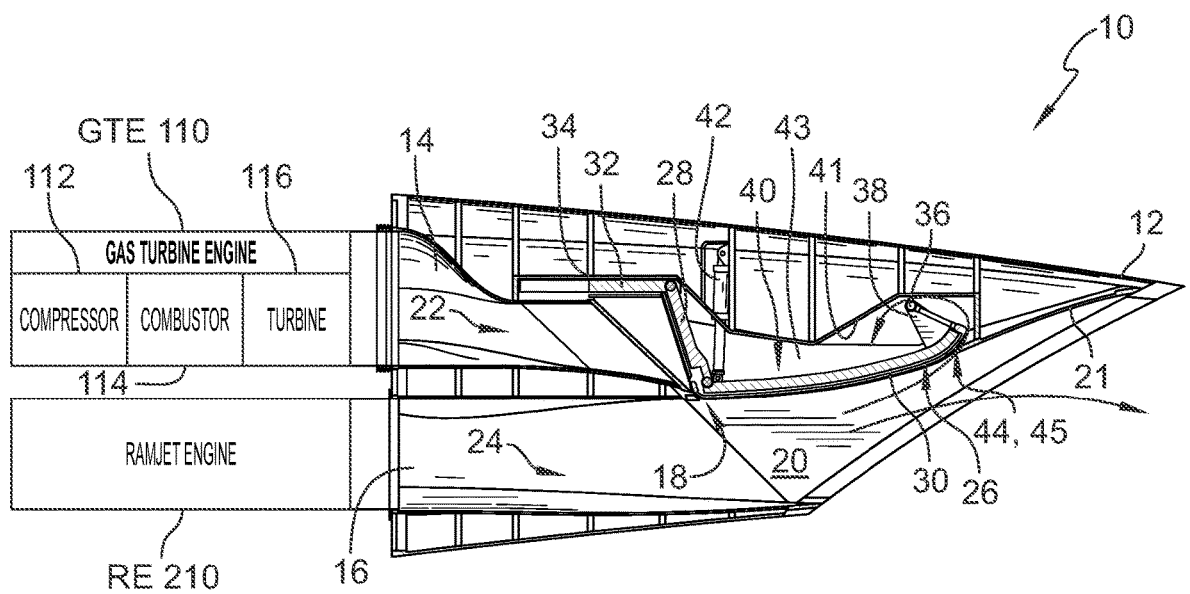
FIG. 1B is a diagrammatic and cross-sectional side elevation view of the dual flow path exhaust assembly of FIG. 1A showing the door in the closed position in response to the combined turbofan and ramjet engine acting in a scramjet mode and the door provides an upper wall flow path for the nozzle and suggesting that a portion of the ramjet exhaust is conducted around the door to provide pressure balancing on the door.
Figure 1C:
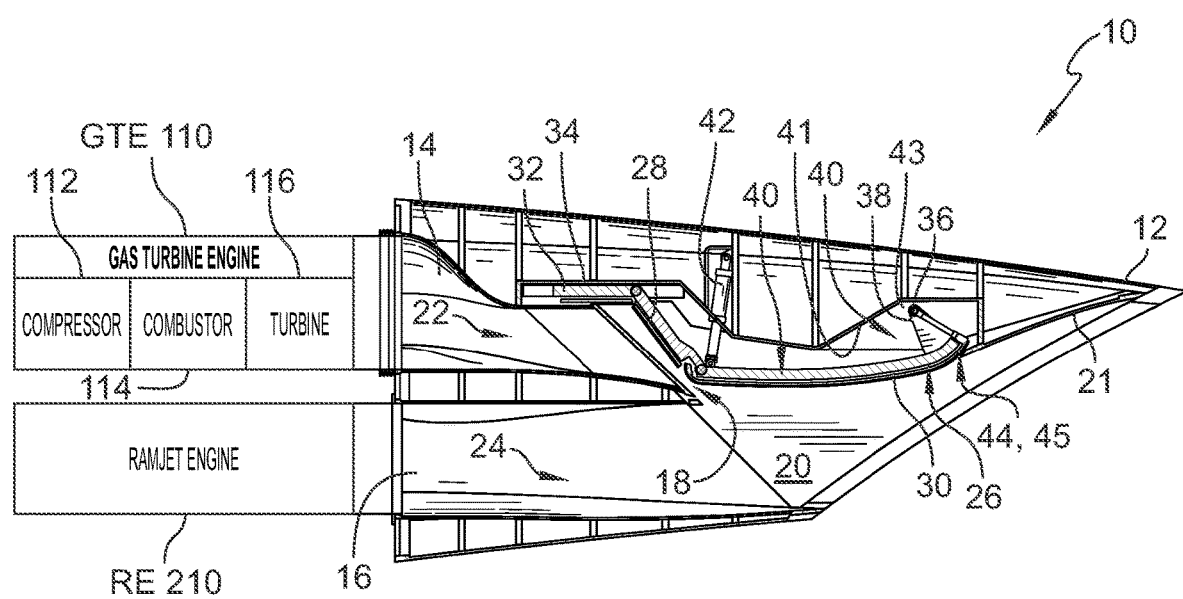
FIG. 1C is a diagrammatic and cross-sectional side elevation view of the dual flow path exhaust assembly of FIG. 1A showing the door in a partially open position between the fully open position and the closed position to vary the flow path and flow rate of the gas turbine engine.
Figure 2A:
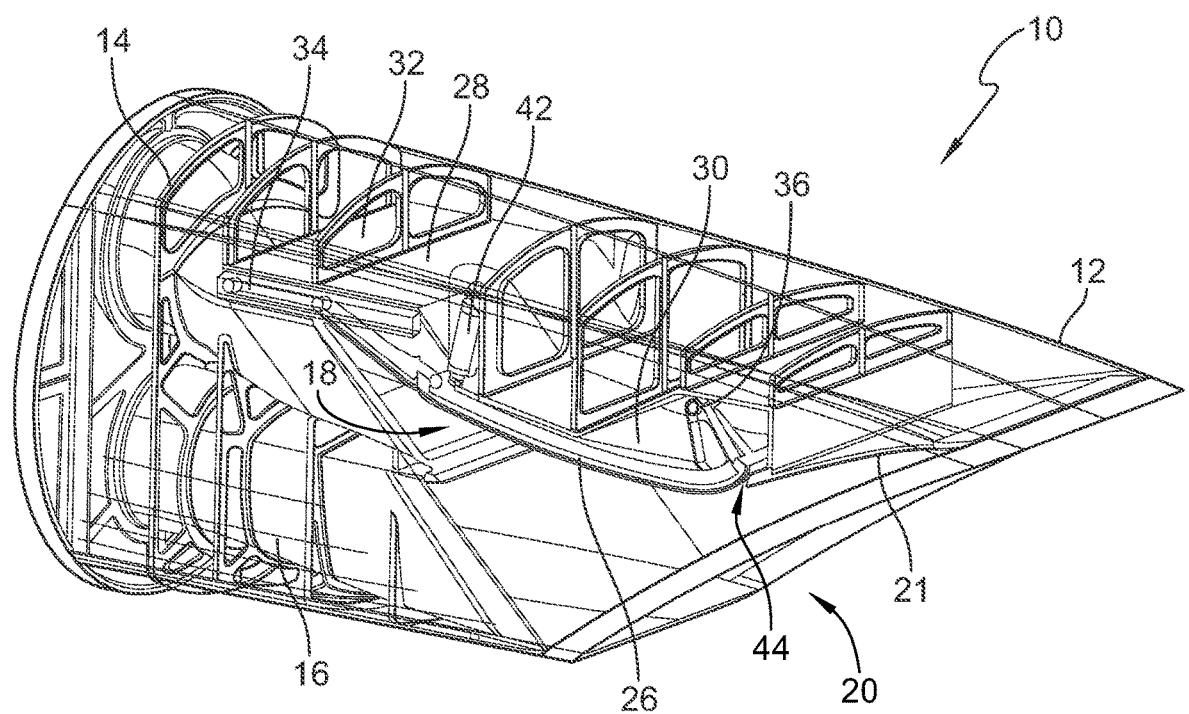
FIG. 2A is a rear perspective view of the assembly of FIG. 1A with a portions of the housing cut away and other portions shown in transparent to show the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in an open position, thereby enabling flow through the turbofan engine exhaust duct to the combined outlet.
Figure 2B:
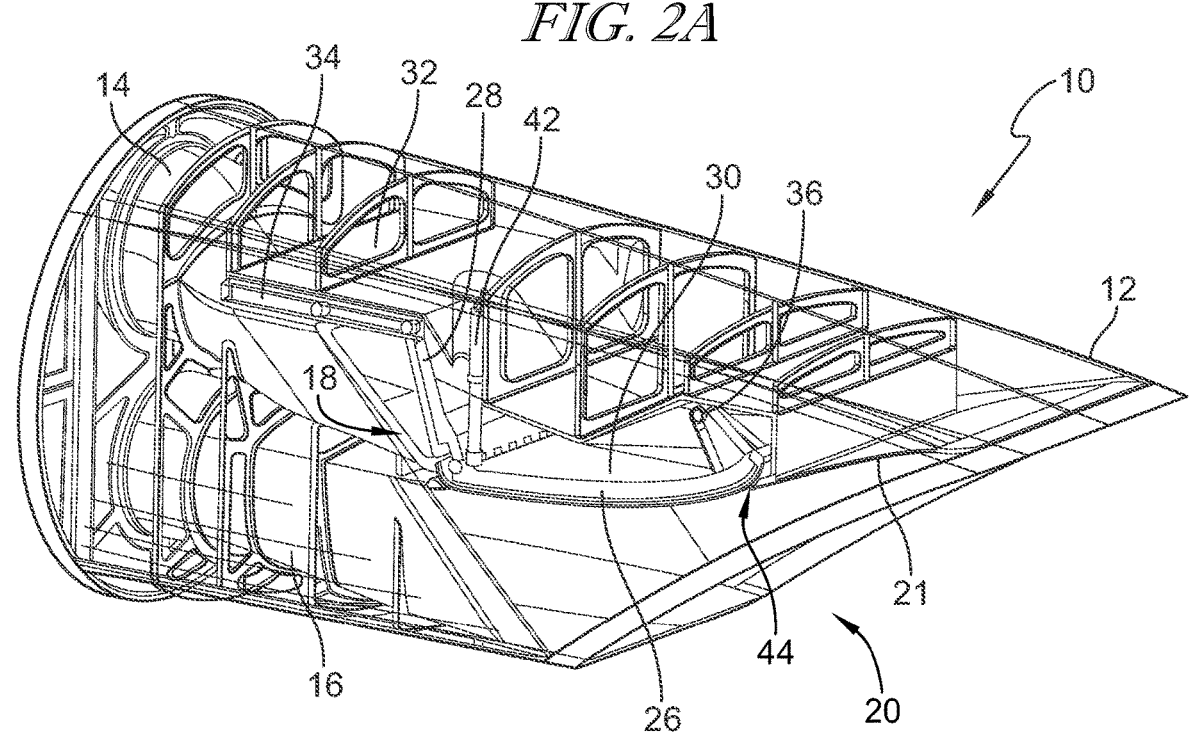
FIG. 2B is a rear perspective view of the assembly of FIG. 1B with portions of the housing cut away and other portions shown in transparent to show the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in a closed position, thereby blocking flow through the turbofan engine exhaust duct to the combined outlet.

A cavity 40 is located on a side of the door 26 facing outwardly away from the second duct 16 as shown in FIGS. 1A and 1B. The cavity 40 has a first volume when the door 26 is in the open position and a second volume different than the first volume when the door 26 is in the closed position. In the illustrated embodiment, the second volume is greater than the first volume. The cavity 40 is defined at least in party by the forward panel 28, the aft panel 30, a top wall 41, and side walls 43 of the ducting.

Figure 3A:
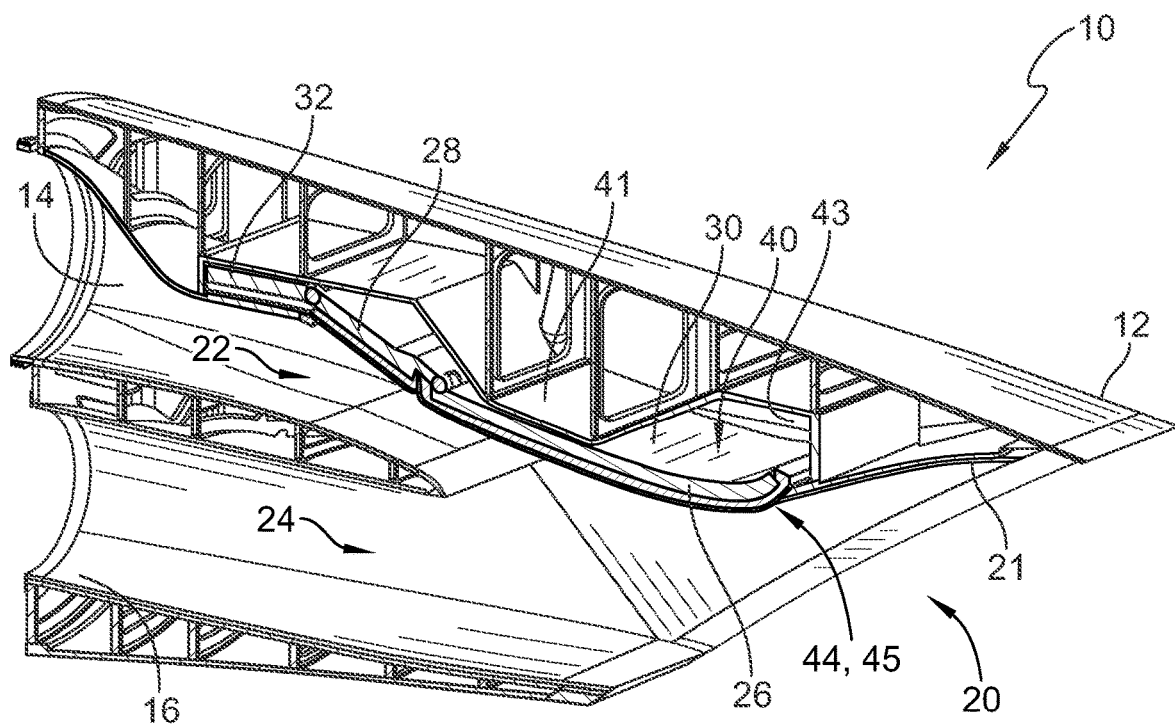
FIG. 3A is a rear perspective view of the assembly of FIG. 1A with a further portion of the housing cut away to show the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in the open position, thereby enabling flow through the turbofan engine exhaust duct to the combined outlet.
Figure 3B:
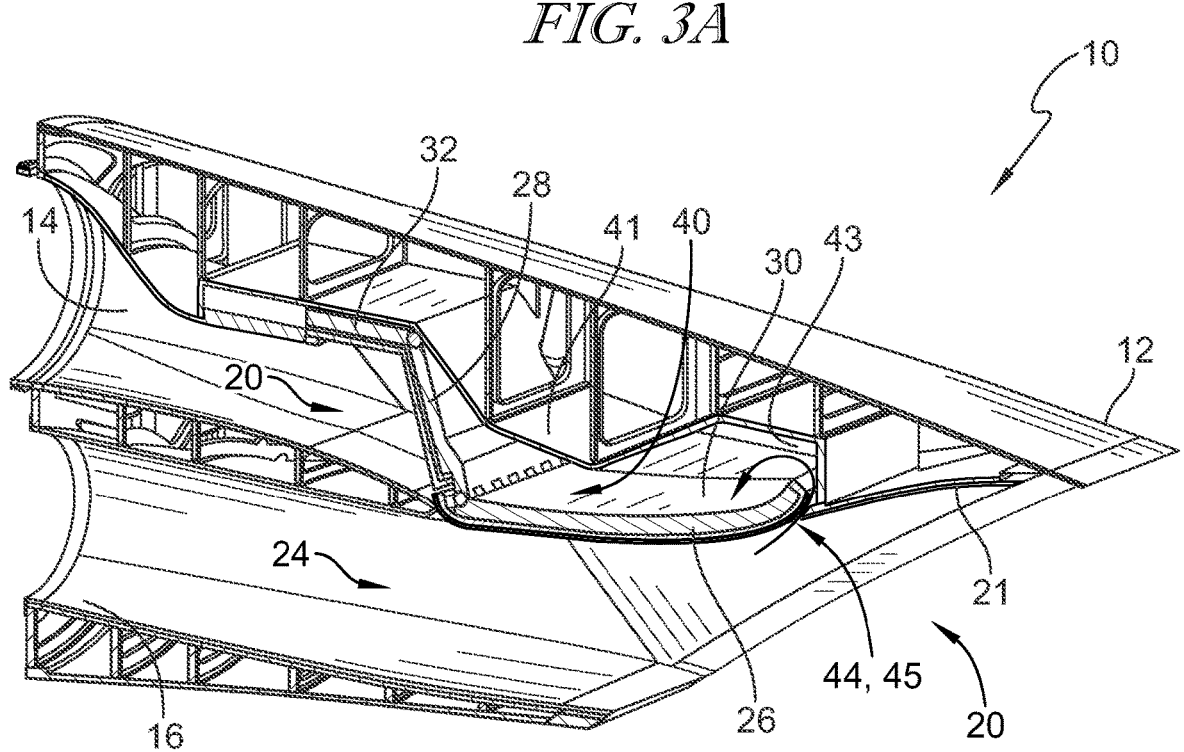
FIG. 3B is a rear perspective view of the assembly of FIG. 1B with a further portion of the housing cut away to show the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in the closed position, thereby blocking flow through the turbofan engine exhaust duct to the combined outlet.

As best shown in FIGS. 3A and 3B, each of the first exhaust duct 14, the second exhaust duct 16, and the combined duct 20 includes a corresponding inner wall having a surface defining at least a portion of the corresponding first flow path 22, second flow path 24, and combined flow path. As best shown in FIGS. 1A-5B, an inner surface of the aft panel 30 of the door 26 facing away from the cavity 40 defines a portion of the first flow path 22 and a portion of the combined flow path when the door 26 is in the open position. The inner surface of the aft panel 30 of the aft panel of the door 26 facing away from the cavity 40 defines a portion of the second flow path 24 when the door 26 is in the closed position. The foregoing wall and door surfaces are smooth and continuous to enable efficient flow of the first, second, and combined streams of pressurized exhaust therethrough. The foregoing wall and door surfaces may be embodied as surfaces of a thermal protection and cooling system, as will discussed further below The assembly 10 further includes one or more actuators 42 (two actuators 42 are shown) configured to move the door 26 between the open position and the closed position as shown in FIGS. 1A and 1B. In the illustrated embodiment, the actuator 42 is a linear actuator having a first end coupled to the housing 12 and a second end coupled to the door 26 proximate the pivotable coupling of the forward panel 28 of the door 26 with the aft panel 30 of the door 23. More specifically, the second end of the actuator 42 is coupled to a forward portion of the aft panel 30 of the door 26 proximate the aft end of the forward panel 28 of the door 26. As shown, the actuator 42 is configured to exert a force on the aft panel 30 of the door in a direction generally perpendicular to the first and second flow paths 22, 24.

During operation of a combined turbofan and ramjet engine in which the assembly 10 may be installed, pressure in one or more of the first exhaust duct 14, the second exhaust duct 16, and the combined outlet 20 may be significantly greater than the pressure in the cavity 40. Under such conditions and without the use of the features of the present disclosure, significant force may be used to move the door 26 from the open position to the closed position to overcome the pressure differential on opposite sides of the door 26. Additionally, significant force may be used to maintain the door 26 in the closed position.

In order to lessen the force required to move the door 26 from the open position to the closed position and maintain the door 26 in the closed position during operation of the combined turbofan and ramjet engine, a pressure equalization passage 44 is provided by the present disclosure between the cavity 40 and the opposite side of the door 26 as shown in FIGS. 1A-3B. The cavity 40 is generally sealed other than the gap 44 so that hot exhaust gas is contained in the cavity 40. In some embodiments, a leakage path other than the gap 44 may be provided to allow a controlled flow of the fluid into the cavity through the gap 44 and out of the cavity through the other leakage path.

Figure 4:
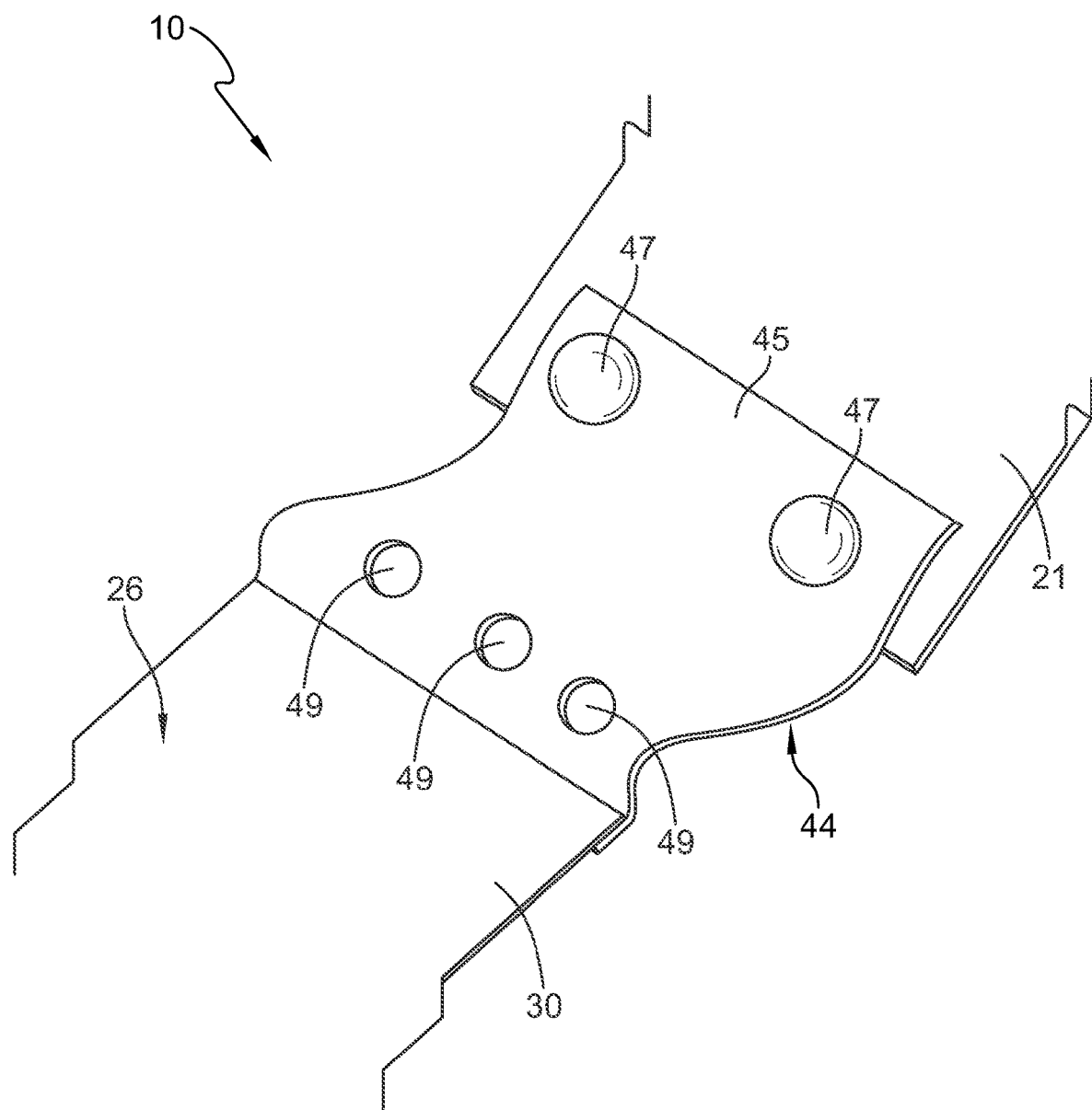
FIG. 4 is a perspective view of a seal plate coupled to a wall of the assembly of FIG. 1A, and sealingly engaged with the door, the seal plate defining metered hoes therethrough for conducting a predetermined amount of fluid through the holes and onto a backside of the door to help pressure balance the door.
Figure 5A:
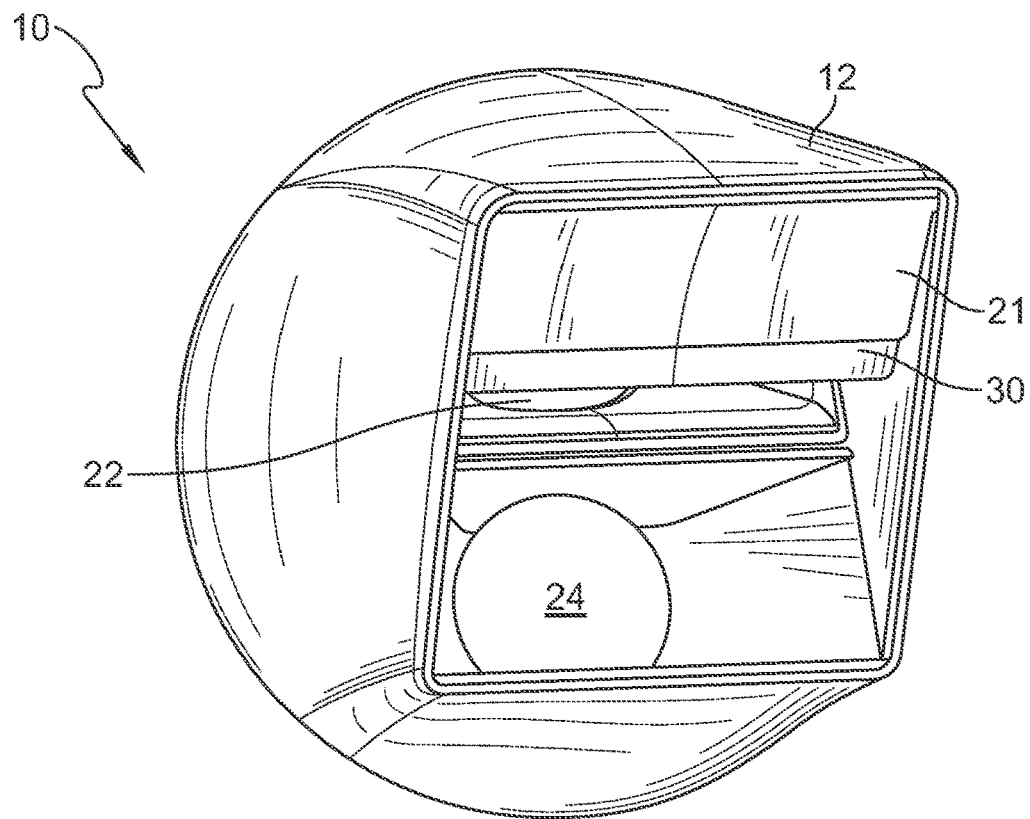
FIG. 5A is a rear perspective view of the assembly of FIG. 1A showing the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in the open position, thereby enabling flow through the turbofan engine exhaust duct to the combined outlet.
Figure 5B:
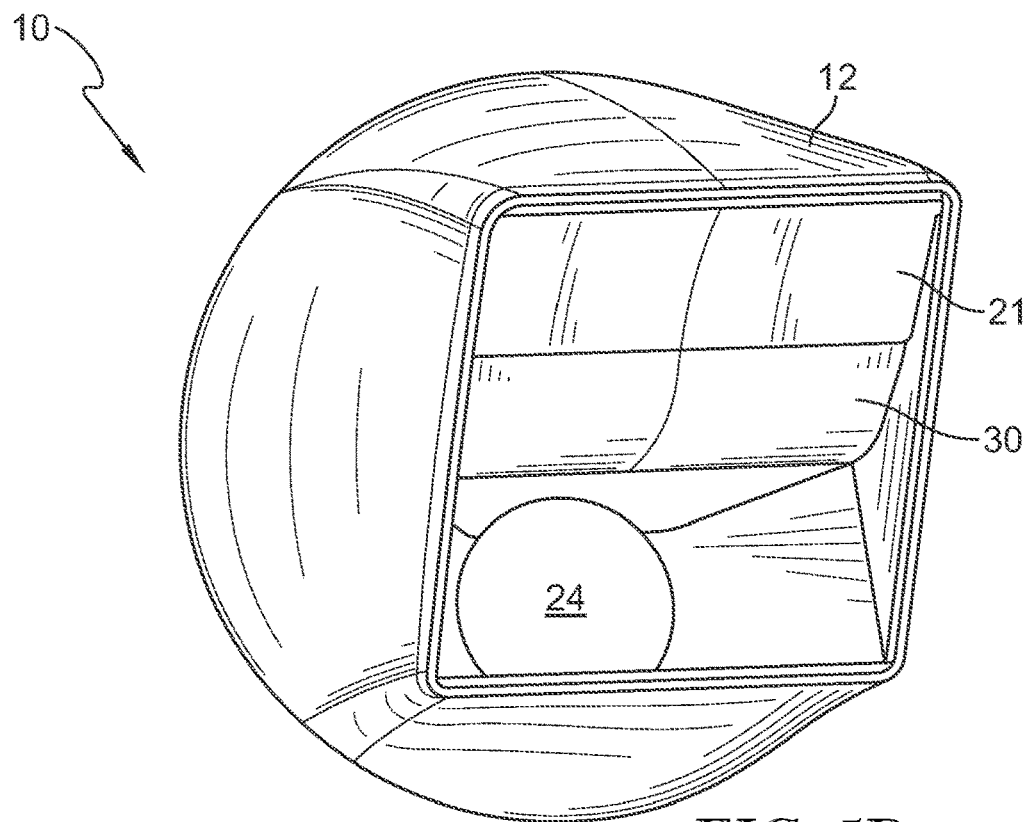
FIG. 5B is a rear perspective view of the assembly of FIG. 1B showing the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in the closed position, thereby blocking flow through the turbofan engine exhaust duct to the combined outlet.

As best shown in FIGS. 3A-4, the pressure equalization passage may be embodied as a gap 44 between the inner surface of the aft end of the aft panel 30 of the door 26 and a corresponding portion of an inner surface of a fixed wall 21 defining a portion of the combined outlet 20. As shown, the forward edge and the aft edge of the aft panel 30 of the door 26 are upswept toward the cavity 40 and outwardly away from the second exhaust duct 16. The upswept forward edge of the aft panel 30 of the door 26 defines an arc that cooperates with the aft edge of the forward panel 28 of the door 26 so as to maintain a substantially constant distance therebetween as the door 26 is moved between the open and closed positions.

The upswept aft edge of the aft panel 30 of the door 26 defines an arc that parallels the arc through which the aft edge of the aft panel 30 of the door 26 travels when the aft panel 30 of the door 26 is pivoted with respect to the housing 12. As such, the gap 44 between the aft edge of the aft panel 30 of the door 26 and the fixed wall 21 may remain constant as the aft panel 30 of the door 26 is pivoted with respect to the housing 12, as occurs when the door 26 is moved between the open and closed positions. The gap 44 allows pressurized fluid to enter the cavity 40 and apply pressure to the outer side of the panel 30 to help offset the pressure applied to inner side (gas path facing side) of the panel 30.

As mentioned above, at least one of the surface of the door 26 facing away from the cavity and the adjacent surface of the fixed wall 21 may be covered with a thermal protection and cooling overlay, as will be discussed further below. In such embodiments, such overlays may further define the gap 44.

In an embodiment, as shown in FIG. 4, a seal plate 45 is sealingly coupled, for example, using rivets 47 or other coupling means, to one of the aft panel 30 of the door 26 and the fixed wall 21 and sealingly engaged with the other of the aft panel 30 of the door 26 and the fixed wall 21, thereby sealing the gap 44. The components in FIG. 4 are broken away and cutaway to show only a portion of the components. The seal plate 45 defines one or more metered holes 49 therethrough. The metered holes 49 are in fluid communication with the cavity 40 and the opposite side of the door 26, and thereby define the pressure equalization passage. The metered holes 49 have a predetermined size to provide the pressure of the fluid into the cavity 40 while minimizing flow of hot exhaust gases into the cavity 40.

In operation, the exhaust assembly 10 may be configured with the door 26 in the open position as shown in FIGS. 1A, 2A, 3A, and 5A. With the door 26 in the open position, the port 18 is uncovered or exposed, thereby enabling flow of the first stream of pressurized exhaust through the first exhaust duct 14, the port 18, and the combined outlet 20, and thereby enabling operation of the turbofan engine GTE 110 providing the first stream of pressurized exhaust. Also, with the door 26 in the open position, the surface of the door 26 opposite the cavity 40 forms a portion of the first duct 14 and the combined outlet 20.

The door 26 may be moved from the open position to the closed position as shown in FIGS. 1B, 2B, 3B, and 5B by extending the actuators 42, thereby pivoting the aft panel 30 of the door 26 about the pivots 36 so that the aft panel 30 of the door 26 blocks the port 18. As the aft panel 30 of the door 26 pivots, the gap 44 between the aft panel 30 of the door 26 remains constant in the illustrative embodiment. Also, as the aft panel 30 of the door pivots, the aft end of the forward panel 28 of the door 26 is drawn toward the port 18. Consequently, the slider 32 and the forward end of the forward panel 28 of the door 26 are drawn in an aft direction through cooperation of the slider 32 with the track 34. With the door 26 in the closed position, the port 18 is blocked, thereby precluding flow of the first stream of pressurized exhaust through the first exhaust duct 14, the port 18, and the combined outlet 20, and thereby precluding operation of a turbofan engine GTE 110 providing the first stream of pressurized exhaust.

The GTE 110 is shut down when the door 24 is closed in the illustrative embodiment. The GTE 110 includes a compressor 112, a combustor 114, and a turbine 116 in the illustrative embodiment as shown in FIG. 1A. The GTE 110 further includes a turbofan arranged within a shroud. The door 26 may be moved from the closed position to the open position by retracting the actuators 42, thereby reversing the motions and effects described above in connection with opening the door 26.

Figure 6:
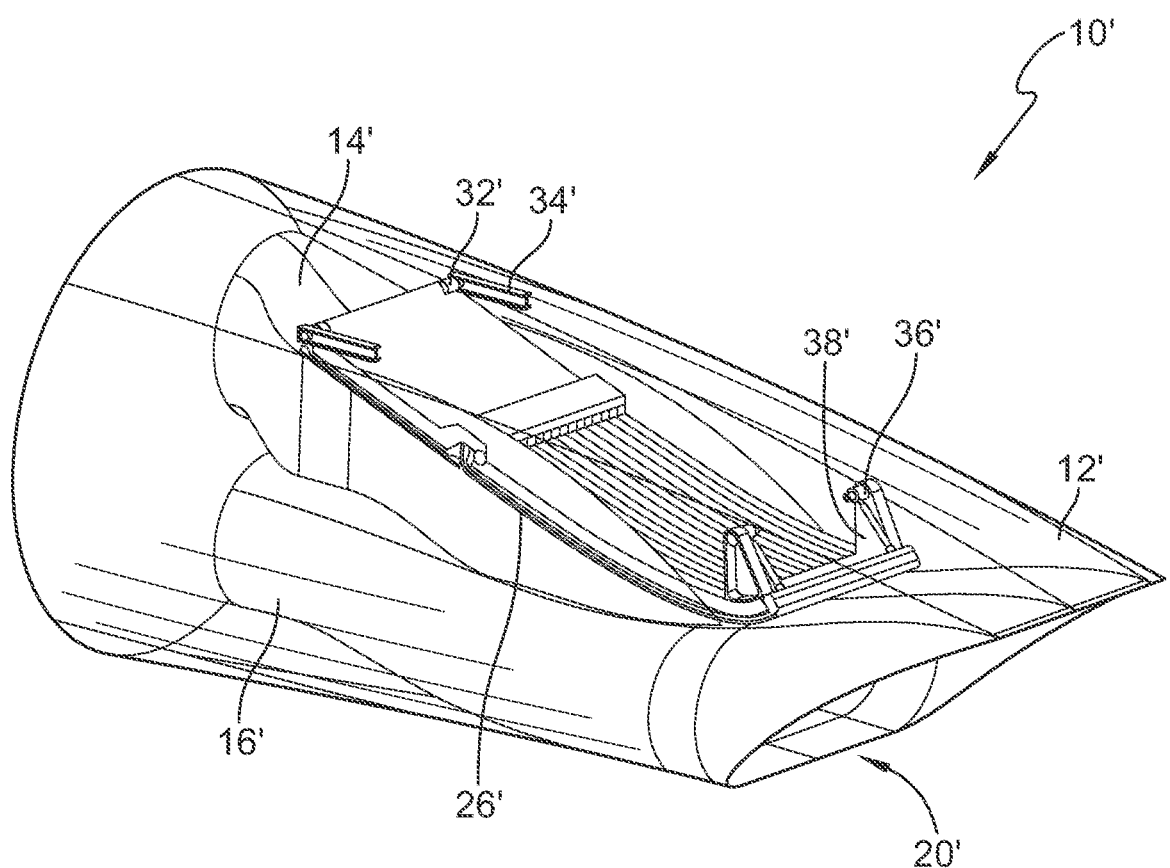
FIG. 6 is a rear perspective view of an alternative embodiment of the of the assembly of FIG. 1A with a portion of the housing in transparent to show the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in an open position, thereby enabling flow through the turbofan engine exhaust duct to the combined outlet.
Figure 7A:
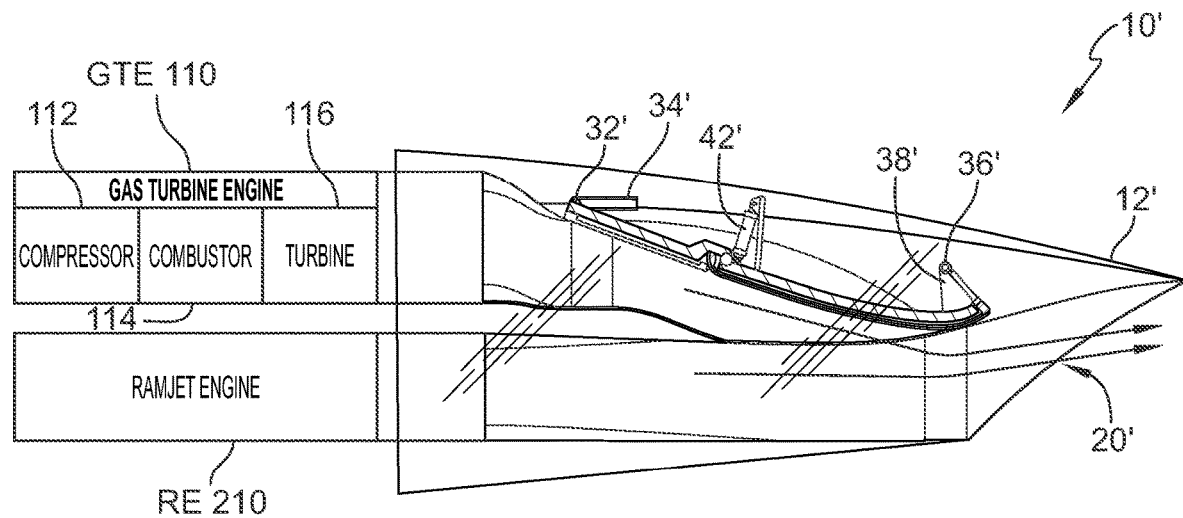
FIG. 7A is a diagrammatic and cross-sectional side elevation view of the assembly of FIG. 6 showing the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in the open position, thereby enabling flow through the turbofan engine exhaust duct to the combined outlet.
Figure 7B:
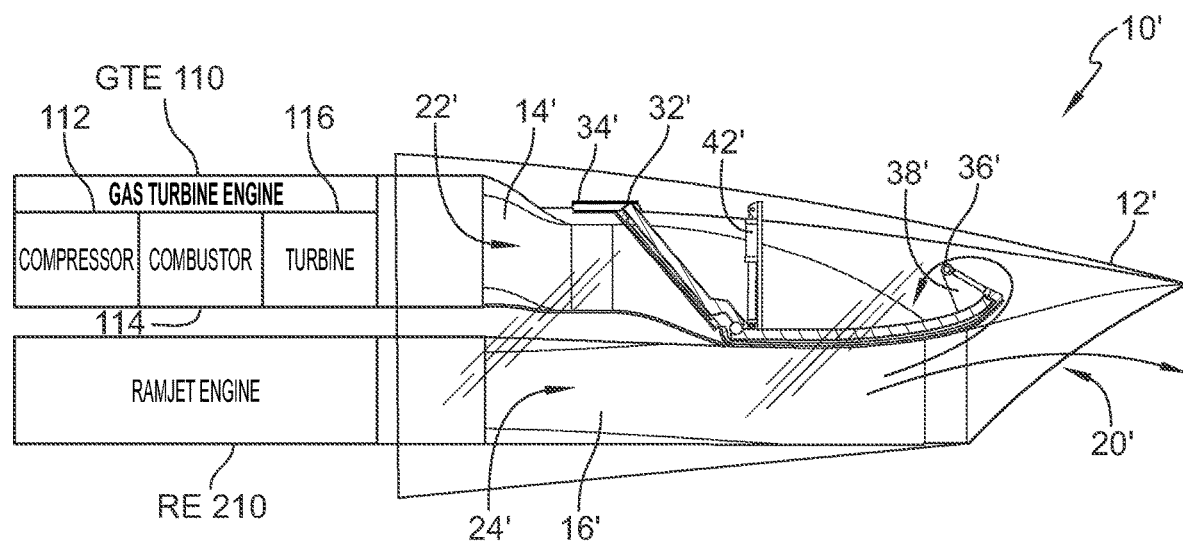
FIG. 7B is a diagrammatic and cross-sectional side elevation view of the assembly of FIG. 6 showing the turbofan engine exhaust duct and the corresponding first flow path, the ramjet exhaust duct and the corresponding second flow path, the combined outlet defined by the convergence of the turbofan engine exhaust duct and the ramjet exhaust duct, and the door in the closed position, thereby blocking flow through the turbofan engine exhaust duct to the combined outlet.

FIGS. 6-7B show an alternative embodiment of a dual flow path exhaust assembly 10' according to the present disclosure. The assembly 10' is substantially similar to the assembly 10. The assembly 10' differs from the assembly 10 primarily in the manner in which the forward panel 28' of the door 26 is coupled to the housing 12'.

More specifically, whereas the forward end of the forward panel 28 of the door 26 of the assembly is pivotably coupled to the slider 32, the forward end of the forward panel 28' of the door 26' is instead coupled to track engaging members 32' at opposite sides of the forward end of the forward panel 28'. The track engaging members 32' are engaged with corresponding tracks 34' coupled to the housing 12'. The track engaging members 32' slide in the tracks 34'. The track engaging members 32' and the tracks 34' are configured so that the track engaging members 32' and, therefore, the forward end of the forward panel 28' of the door 26, may move in a fore and aft direction with respect to the housing 12'. The track engaging members 32' may be embodied as sliders, rollers, or other suitable structures.

As suggested above, operation of the assembly 10 may subject the first exhaust duct 14, the second exhaust duct 16, the combined outlet 20, and the door 26 to extremely high temperatures, which may be detrimental to the structural integrity of the first exhaust duct 14, the second exhaust duct 16, the combined outlet 20, and the door 26. Accordingly, as mentioned above, any or all of the inner walls of the first exhaust duct 14, the second exhaust duct 16, the combined outlet 20, and the inner surface of the door 26 opposite the cavity 40 may be covered with one or more corresponding thermal protection and cooling overlays 70 configured to protect the foregoing walls and surface from the high temperatures caused by the exhaust gases flowing through the first exhaust duct 14, the second exhaust duct 16, and the combined outlet 20.

Figure 8:
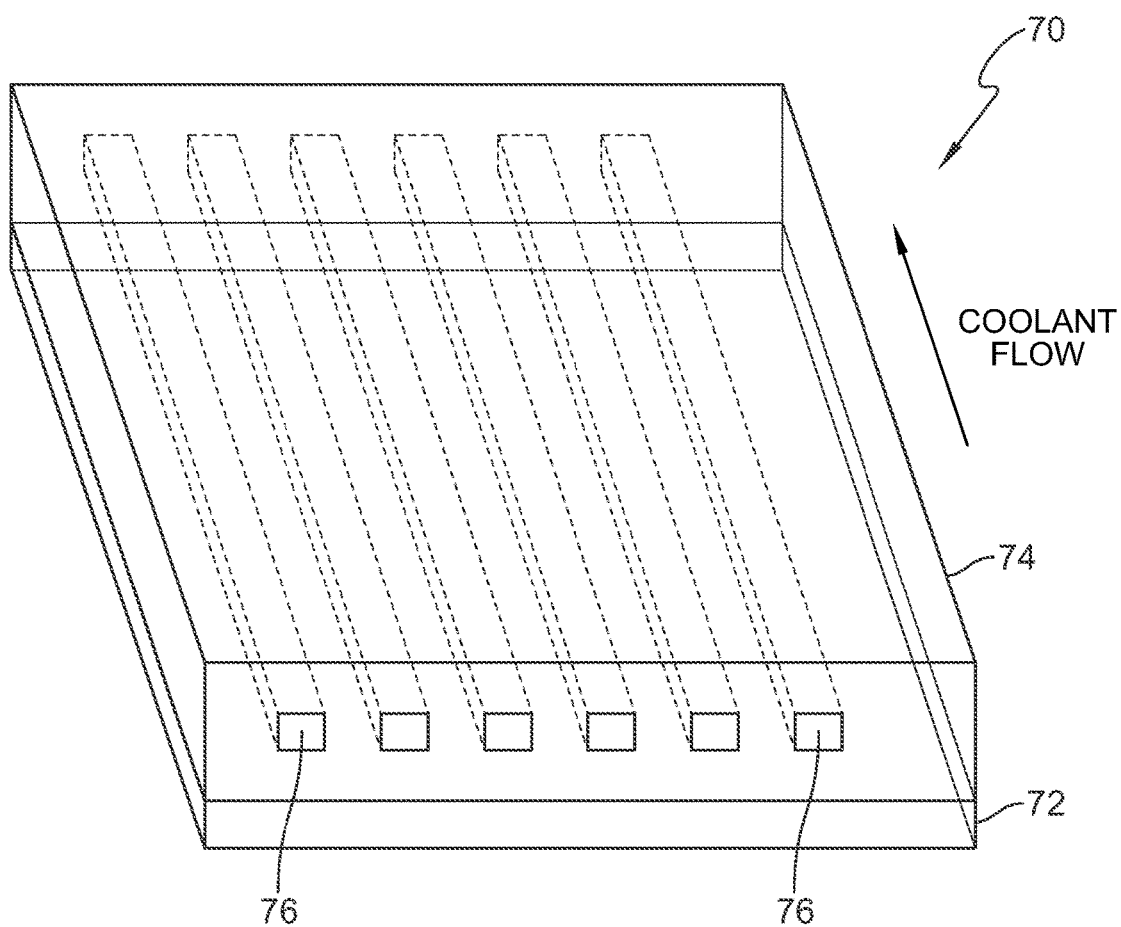
FIG. 8 is a perspective view of an illustrative thermal protection and cooling overlay according to the present disclosure for use with the assemblies of FIGS. 1A-7B.
Figure 9:
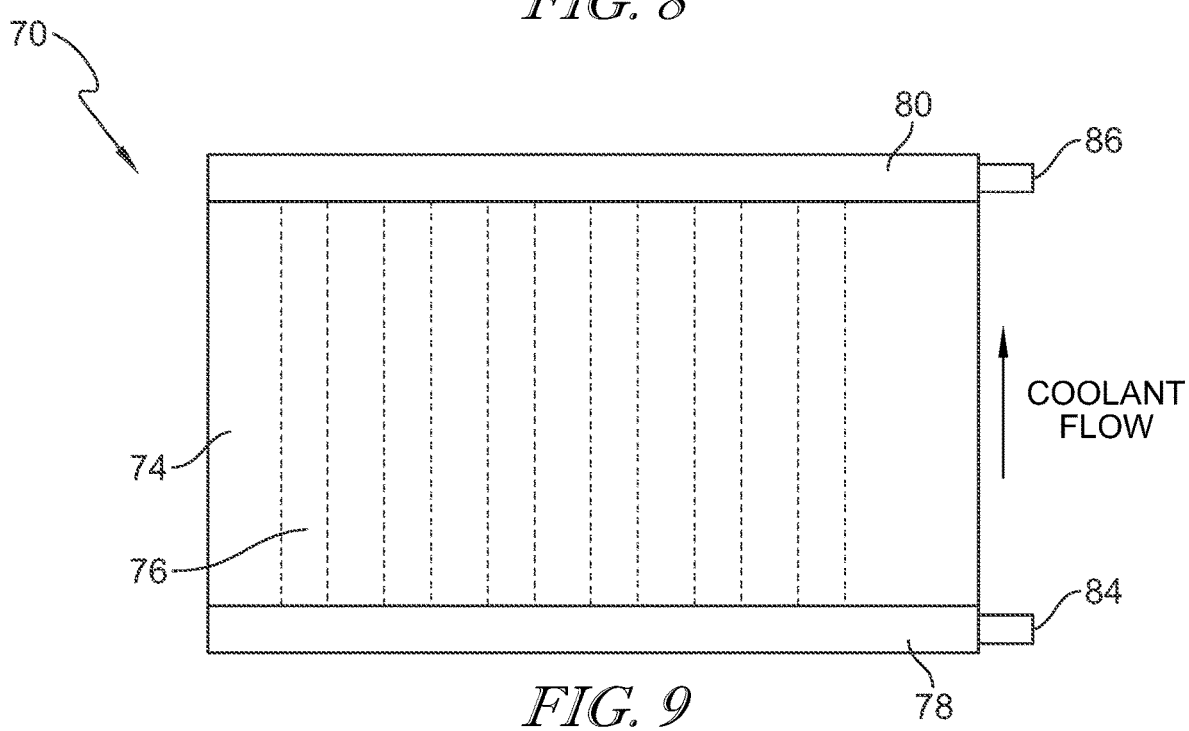
FIG. 9 is a partial top plan view of the overlay of FIG. 8.

FIGS. 8 and 9 show an illustrative embodiment of a thermal protection and cooling overlay 70 according to the present disclosure. The overlay 70 includes a skin 72 and a heat exchanger 74 coupled to the skin 72 in a manner that provides for good heat transfer between the skin 72 and the heat exchanger 74. In an embodiment, the heat exchanger 74 may be bonded to the skin 72. In an embodiment, the skin 72 may be made of a ceramic material, and the heat exchanger 74 may be made of a metal alloy suitable for use in high temperature environments and having good heat transfer properties.

As suggested above, and as shown in the drawings, the exposed surface of the skin 72 opposite the heat exchanger 74 may further define the first flow path 22, the second flow path 24, and the combined flow path. As such, the exposed surface of the skin 72 is configured to enable smooth flow of pressurized exhaust thereacross.

Figure 10:
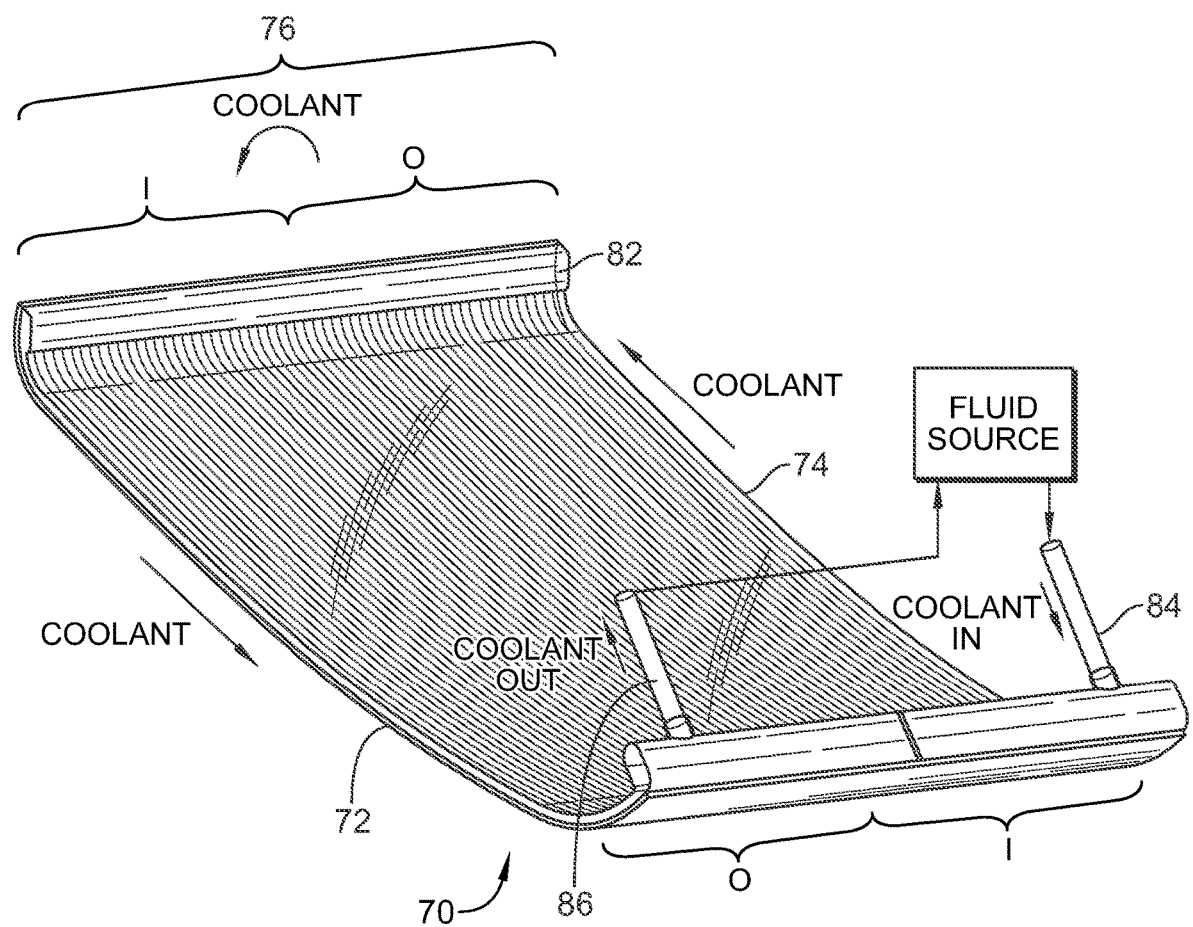
FIG. 10 is a perspective view of illustrative thermal protection and cooling overlay according to the present disclosure configured to be coupled to the door of the assembly of FIG. 1A.

The heat exchanger 74 defines a plurality of cooling channels 76 extending therethrough and configured to convey a liquid coolant therethrough as suggested in FIG. 10. Each of the cooling channels 76 has an inlet end I and an outlet end O. The inlet ends of plural ones of the cooling channels 76 may be in fluid communication with each other and with an inlet manifold 78. Similarly, the outlet ends of plural ones of the cooling channels 76 may be in fluid communication with each other and with an outlet manifold 80.

The inlet manifold 78 is configured to receive the liquid coolant from a source of liquid coolant associated with the assembly 10 and to supply the liquid coolant to the inlet ends of the cooling channels 76. Similarly, the outlet manifold 80 is configured to receive the liquid coolant from the outlet ends of the cooling channels 76 and to return the liquid coolant from a source of liquid coolant associated with the assembly 10.

The inlet manifold 78 may receive the liquid coolant from the source of liquid coolant by any suitable conduit, for example, any suitable line, hose, or tube extending from the inlet manifold 78 to the source of liquid coolant. Similarly, outlet manifold 80 may return the liquid coolant to the liquid coolant receiver by any suitable conduit, for example, any suitable line, hose, or tube extending from the outlet manifold 80 to the liquid coolant receiver.

In some embodiments, the outlet ends of ones of the cooling channels 76 may be in fluid communication with each other and with the inlet ends of other ones of the cooling channels 76 through an intervening return manifold 82. For example, with reference to FIG. 10, which shows an overlay 70 configured for coupling to the door 26, the heat exchanger 74 may be configured so that a first plurality of cooling channels 76 receives liquid coolant at inlet ends I thereof through the inlet manifold 78, so that the first plurality of cooling channels 76 discharges liquid coolant at outlet ends O thereof to the return manifold 82, so that a second plurality of cooling channels 76 receives liquid coolant at inlet ends I thereof through the return manifold 82, and so that the second plurality of cooling channels 76 discharges liquid coolant at outlet ends O thereof to the outlet manifold 80. FIGS. 9 and 10 also shows an inlet pipe 84 configured to convey liquid coolant from the source of liquid coolant to the inlet manifold 78, and an outlet pipe 86 configured to convey liquid coolant from the outlet manifold 80 to the liquid coolant receiver.

Figure 11:
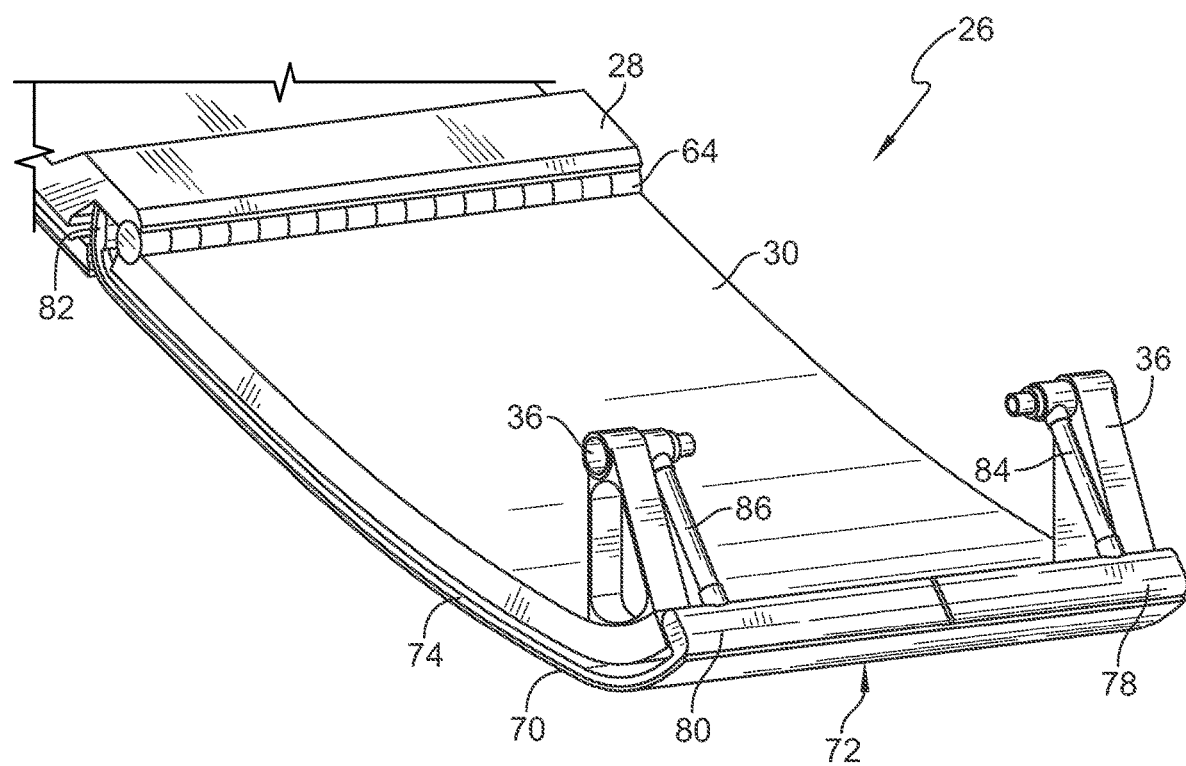
FIG. 11 is a perspective view of the thermal protection and cooling overlay of FIG. 10 coupled to the door of the assembly of FIG. 1A.

As shown in FIG. 11, the liquid coolant may be provided to the inlet manifold 78 of the aft panel 30 of the door 26 through one of the pivots 36. Similarly, the liquid coolant may be returned from the outlet manifold 80 of the aft panel 30 of the door 26 to a liquid coolant receiver through another one of the pivots 36. More specifically, the aft panel 30 of the door 26 is pivotably coupled to the housing 12 by pivots 36. A first one of the pivots 36 may be provided with a first internal passage (not shown) configured to receive the liquid coolant from a corresponding liquid coolant supply associated with the housing 12 and convey the liquid coolant to the inlet manifold 78 via the inlet pipe 84. Similarly, a second one of the pivots 36 may be provided with a second internal passage (not shown) configured to receive the liquid coolant from the outlet manifold 80 via the outlet pipe 86 and convey the liquid coolant to a corresponding liquid coolant return associated with the housing 12.

In an embodiment (not shown), the cooling channels 76 of an overlay 70 coupled to the forward panel 28 of the door 26 are fluidly coupled to the cooling channels 76 of an overlay 70 coupled to the aft panel 30 of the door 26 via fluid passages internal to a pivot mechanism 64 coupling the forward panel 28 of the door 26 to the aft panel 30 of the door 26.

Figure 12:
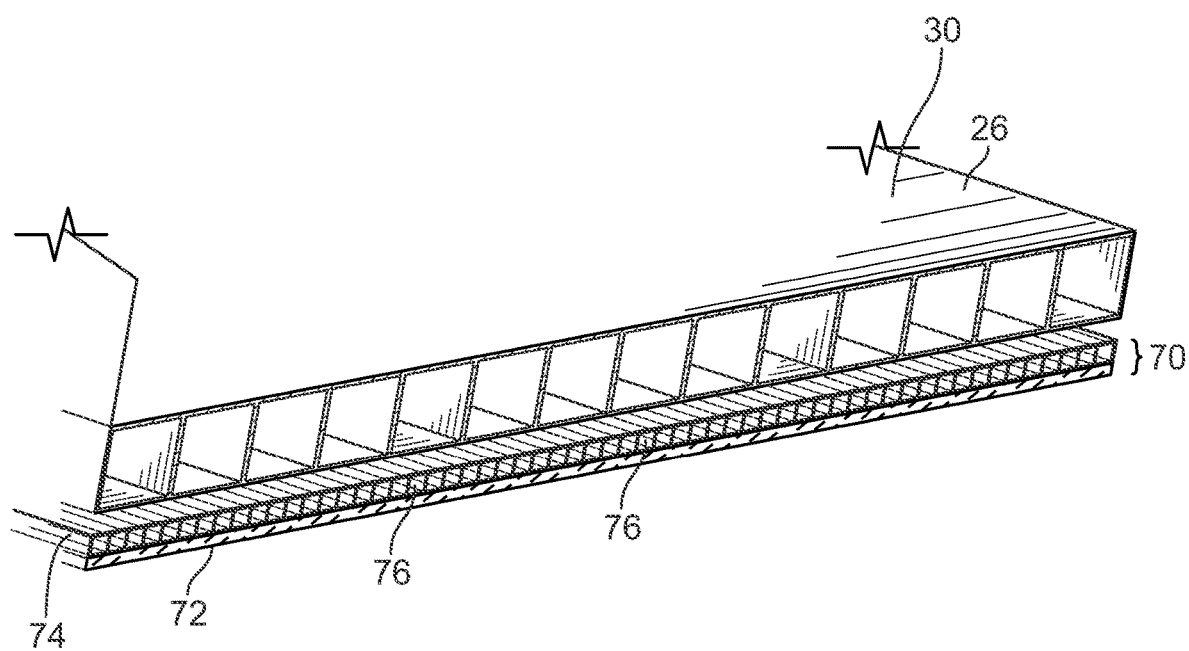
FIG. 12 is a cross-sectional perspective view of the thermal protection and cooling overlay and door of FIG. 11.
Figure 13:
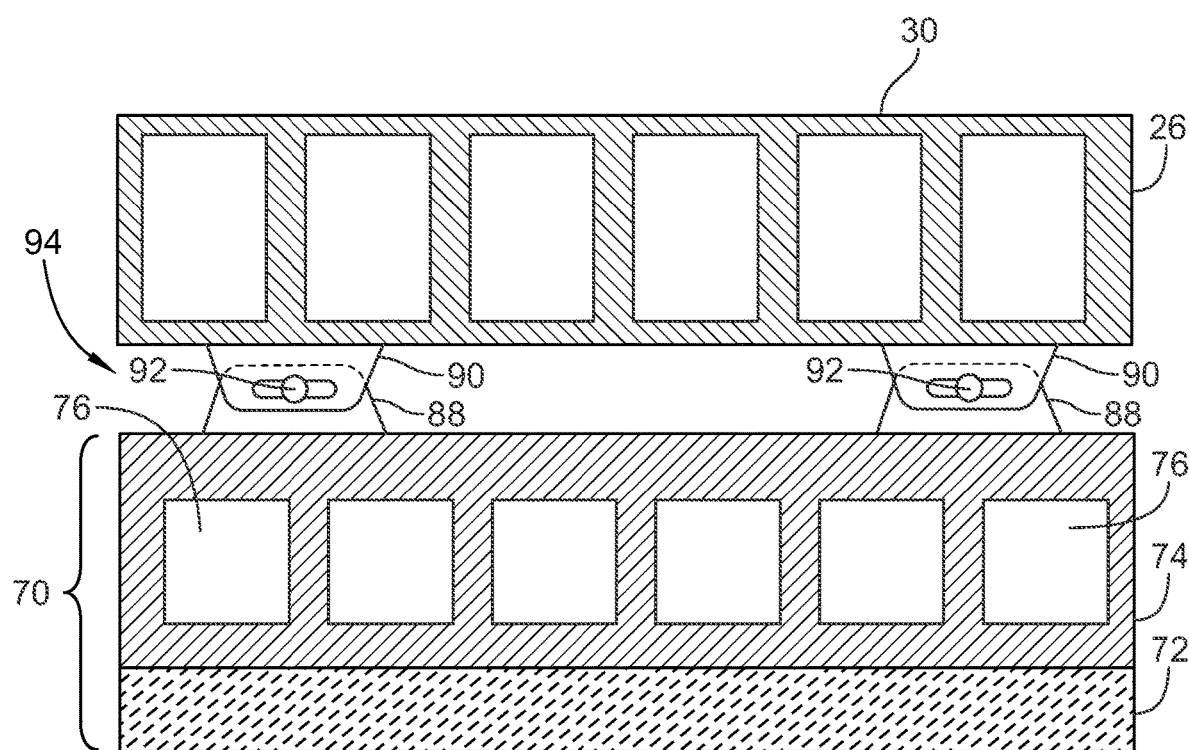
FIG. 13 is a cross-sectional end view of the thermal protection and cooling overlay and door of FIG. 11.

As best shown in FIGS. 12 and 13, the overlay may be coupled to the door 26 or to a wall defining the first exhaust duct 14, the second exhaust duct 16, or the combined outlet 20 in a manner that allows differential thermal growth of the overlay 70 and the door 26 or wall with which the overlay 70 may be coupled. For example, as shown in FIG. 13, both the overlay 70 and the door 26 or wall may be provided with complementary mounting flanges 88, 90, each defining a slot through which a pin 92 or other fastener may be received, thereby securing the overlay 70 to the door 26 or wall in a manner that allows side-to-side and end-to-end thermal growth of the overlay 70 with respect to the door 26 or other wall. A gap 94 is defined between the overlay 70 and the panel 30 in the illustrative embodiment.

Figure 14:
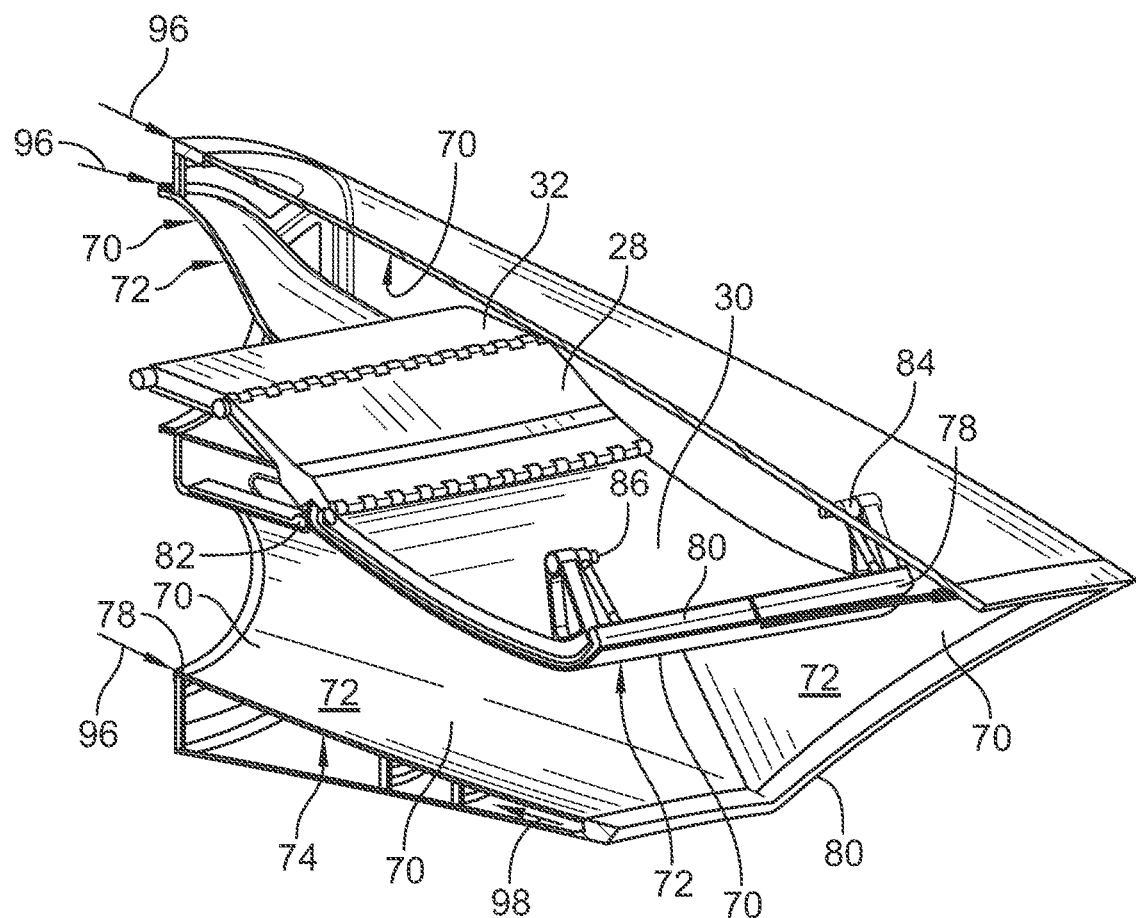
FIG. 14 is a cut-away perspective view of the assembly of FIG. 1A with thermal protection and cooling overlays as shown in FIGS. 8 and 9 coupled to interior wall surfaces thereof.

As shown in FIG. 14, one or more overlays 70 may be coupled to any or all of the inner walls 43 of the first exhaust duct 14, the second exhaust duct 16, the combined outlet 20, and the surface of the door 26 facing away from the cavity 40. The overlay(s) 70 are coupled directly to the wall 43 in the illustrative embodiment. As such the heat exchanger layer 74 is in direct contact with the inner wall 43. In other embodiments, an air gap is formed between the overlay(s) 70 and the inner wall 43.

In some embodiments, the overlays 70 are coupled to any or all of the first exhaust duct 14, the second exhaust duct 16, the combined outlet 20, and the door 26 so that the liquid coolant flows through the cooling channels predominantly in a fore and aft direction. In other embodiments, the overlays may be coupled to any or all of the first exhaust duct 14, the second exhaust duct 16, the combined outlet 20, and the door 26 so that the liquid coolant flows through the cooling channels predominantly in other directions. Heat from the exhaust flows heats the overlays 70 and the fuel flowing in the overlays carry the rejected heat away to cool the housing 12 and door 26.

In the illustrative embodiment, fuel is conducted from an axially forward end of the housing 12 through the overlays 70 to an aft end of the housing 12 as shown in FIG. 14. The fuel inlet is indicated by arrows 96. The fuel now having heat rejected therein may be collected at the aft end at the exit of the housing 12 and directed internally or externally of the housing 12 to the fuel source. The fuel outlet is indicated by arrow 98. In other embodiments, the fuel is conducted aft to forward or circumferentially around the housing 12.

The liquid coolant may be fuel carried by an aircraft in which the assembly 10 may be installed and for combustion in an engine of the aircraft. The source of liquid coolant may be a fuel tank of the aircraft containing such fuel. The liquid coolant receiver may be the fuel tank or another tank configured to receive the liquid coolant. In an embodiment, the liquid coolant receiver may be an engine of the aircraft, for example, one of the turbofan engine GTE 110 and the ramjet engine RE 210. The fuel may be used due to the few options available for cooling sinks at high speeds (for example greater than Mach 0.8 and/or high altitudes). In other embodiments, the coolant may be other fluids such as gases. In one example, the coolant is air from the compressor 112. Such air coolant may be used with engines and systems configured to subsonic travel.

Although the overlay 70 has been described for use in a dual flow path exhaust assembly including a turbofan engine exhaust duct, a ramjet engine exhaust duct, and a combined outlet, the overlay 70 could be uses in other aircraft engine applications.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A dual flow path exhaust assembly for use with a combined turbofan and ramjet engine including a turbofan engine configured to provide a first stream of pressurized exhaust and a ramjet engine configured to provide a second stream of pressurized exhaust, the exhaust assembly comprising:
    a housing including a turbofan engine exhaust duct, a ramjet engine exhaust duct, and a combined outlet defined by a confluence of an aft end of the turbofan engine exhaust duct and an aft end of the ramjet engine exhaust duct, the turbofan engine exhaust duct defining a first flow path configured to convey the first stream of pressurized exhaust therethrough, the ramjet engine exhaust duct defining a second flow path configured to convey the second stream of pressurized exhaust therethrough, and the combined outlet in fluid communication with the ramjet engine exhaust duct and in selective fluid communication with the turbofan engine exhaust duct and configured to receive the second stream of pressurized exhaust therethrough and to selectively receive and convey the first stream of pressurized exhaust therethrough;
    a door coupled to the housing, the door configured to move between a plurality of positions to vary a throat of the assembly and to selectively block the turbofan engine exhaust duct from the ramjet engine exhaust duct and the combined outlet; and
    an actuator configured to move the door between an open position in which the door exposes the turbofan engine exhaust duct to the ramjet engine exhaust duct and the combined outlet and a closed position in which the door blocks the turbofan engine exhaust duct from the ramjet engine exhaust duct and the combined outlet;
    wherein the housing and the door cooperate to define a cavity therebetween on a side of the door opposite the ramjet exhaust duct; and
    wherein the housing and the door cooperate to define a pressure equalization passage in continuous fluid communication with the combined outlet and the cavity to cause at least a portion of a pressure of the second stream of pressurized exhaust to be applied to the side of the door opposite the ramjet exhaust duct.

2. The dual flow path exhaust assembly of claim 1, wherein the door comprises a forward panel and an aft panel pivotably coupled to the forward panel.

3. The dual flow path exhaust assembly of claim 2, wherein the aft panel of the door comprises a forward end and an aft end, and wherein the aft panel is pivotably coupled to the housing at a pivot point proximate and spaced from the aft end of the aft panel of the door, whereby the aft end of the aft panel of the door travels through an arcuate path as the door cycles between the open position and the closed position.

4. The dual flow path exhaust assembly of claim 2, wherein the pivot point is forward of the aft end of the aft panel of the door both when the door is in the open position and when the door is in the closed position.

5. The dual flow path exhaust assembly of claim 4, wherein the aft end of the aft panel of the door extends into the cavity at least when the door is in the closed position.

6. The dual flow path exhaust assembly of claim 3, wherein the door defines a portion of the combined outlet both when the door is in the open position and when the door is in the closed position.

7. The dual flow path exhaust assembly of claim 6, wherein the actuator is configured to move a forward portion of the aft panel of the door between a first position in which the forward portion of the aft panel of the door is distant from the port and a second position in which the forward portion of the aft panel of the door abuts the portion of the housing separating the turbofan engine exhaust duct from the ramjet engine exhaust duct.

8. The dual flow path exhaust assembly of claim 7, wherein the actuator is a linear actuator having a first end connected to the housing and a second end connected to the door proximate the pivotable coupling of the forward door panel to the aft door panel.

9. The dual flow path exhaust assembly of claim 8, further comprising a slider engaged with a track coupled to the housing, wherein a forward portion of the forward panel of the door is pivotably coupled to the slider, the track guiding the forward portion of the slider in a fore and aft direction as the door moves between the open position and the closed position.

10. The dual flow path exhaust assembly of claim 8, further comprising track engaging members engaged with a track coupled to the housing, wherein a forward portion of the forward panel of the door is coupled to the track engaging members, the track guiding the track engaging members in a fore and aft direction as the door moves between the open position and the closed position.

11. The dual flow path exhaust assembly of claim 1, wherein the pressure equalization passage comprises a gap between the housing and an aft portion of the aft panel of the door.

12. The dual flow path exhaust assembly of claim 1, wherein the pressure equalization passage comprises at least one metered hole defined by a seal panel sealingly engaged with the housing and an aft portion of the aft panel of the door.

13. A dual flow path exhaust assembly for use with a combined turbofan and ramjet engine, the exhaust assembly comprising:
    a housing containing a first exhaust duct, a second exhaust duct, and a combined outlet defined by a convergence of an aft end of the first exhaust duct and an aft end of the second exhaust duct, the combined outlet in fluid communication with the second engine exhaust duct and in selective fluid communication with the first exhaust duct;
    a door configured to selectively block the first exhaust duct from the second exhaust duct and the combined outlet; and
    an actuator configured to move the door between an open position in which the door exposes the first exhaust duct to the second exhaust duct and the combined outlet, a closed position in which the door blocks the first exhaust duct from the second exhaust duct and the combined outlet, and a plurality of positions between the open position and the closed position to vary a throat of the assembly;

wherein the housing and the door cooperate to define a cavity therebetween on a side of the door opposite the second exhaust duct;

wherein the housing and the door cooperate to define a pressure equalization passage in continuous fluid communication with the combined outlet and the cavity to cause at least a portion of a stream of pressurized exhaust from the second exhaust duct to apply pressure to the side of the door opposite the second exhaust duct; and wherein the door comprises a forward panel and an aft panel pivotably coupled to the forward panel and wherein the aft panel of the door comprises a forward end, an aft end, and a pivot point proximate the aft end, whereby the aft end of the aft panel of the door travels through an arcuate path as the door moves between the open position and the closed position to maintain the continuous fluid communication of the combined outlet and the cavity through the pressure equalization passage as the door moves between the open position and the closed position.

14. The dual flow path exhaust assembly of claim 13, wherein the door defines a portion of the combined outlet both when the door is in the open position and when the door is in the closed position.

15. The dual flow path exhaust assembly of claim 13, further comprising a slider engaged with a track coupled to the housing, wherein a forward portion of the forward panel of the door is pivotably coupled to the slider, the track guiding the forward portion of the slider in a fore and aft direction as the door moves between the open position and the closed position.

16. The dual flow path exhaust assembly of claim 13, further comprising track engaging members engaged with a track coupled to the housing, wherein a forward portion of the forward panel of the door is coupled to the track engaging members, the track guiding the track engaging members in a fore and aft direction as the door moves between the open position and the closed position.

17. The dual flow path exhaust assembly of claim 14, wherein the actuator is a linear actuator having a first end connected to the housing and a second end connected to the door proximate the pivotable coupling of the forward door panel to the aft door panel.

18. The dual flow path exhaust assembly of claim 13, wherein the pressure equalization passage comprises a gap between the housing and an aft portion of the aft panel of the door and wherein the gap remains constant as the door moves between the open position and the closed position.

19. A method of controlling flow through a combined outlet of a dual flow path exhaust assembly including a first exhaust duct and a second exhaust duct converging together to define the combined outlet, the method comprising:

providing a housing defining the first exhaust duct, the second exhaust duct, and the combined outlet;

providing a door configured to selectively block the first exhaust duct from the second exhaust duct and the combined outlet, the door comprising a forward panel and aft panel pivotably connected to the forward panel, the forward panel engaged with a track coupled to the housing and the aft panel pivotably coupled to the housing, the door cooperating with the housing to define a cavity therebetween on a side of the door opposite the combined outlet and distinct from the first exhaust duct, the second exhaust duct and the combined outlet, and the aft panel of the door has an upswept aft end that cooperates with the housing to define a pressure equalization gap between the housing and the aft end of the aft panel of the door and the pressure equalization gap is in continuous fluid communication with the combined outlet and the cavity;

providing an actuator configured to cycle a forward portion of the aft panel of the door between a first position in which the forward portion of the aft panel of the door is distant from a portion of the housing separating the first exhaust duct from the second exhaust duct and a second position in which the forward portion of the aft panel of the door abuts the portion of the housing separating the first exhaust duct from the second exhaust duct; and moving the forward portion of the aft panel between the second position wherein the door blocks the first exhaust duct from the second exhaust duct and the first position wherein the first exhaust duct is exposed to the second exhaust duct so that the pressure equalization gap remains constant as the door moves between the first position and the second position so that at least a portion of a stream of pressurized exhaust from the second exhaust duct applies pressure to the side of the door opposite the combined outlet.

* * * * *